United States Patent

Beyda et al.

[11] Patent Number: 5,889,839
[45] Date of Patent: Mar. 30, 1999

[54] SYSTEM AND METHOD FOR PROVIDING AUTOMATED MESSAGE NOTIFICATION IN A WIRELESS COMMUNICATION SYSTEM

[75] Inventors: William J. Beyda, Cupertino; Shmuel Shaffer, Palo Alto, both of Calif.

[73] Assignee: Siemens Information and Communication Networks, Inc., Boca Raton, Fla.

[21] Appl. No.: 724,295

[22] Filed: Sep. 19, 1996

[51] Int. Cl.[6] .............................. H04M 3/42; H04M 1/64
[52] U.S. Cl. ...................... 379/88.12; 455/412; 455/413; 379/88.22; 379/88.25
[58] Field of Search ...................... 445/412, 413, 445/414; 379/88, 89, 67, 88.12, 88.22, 88.23, 88.25

[56] References Cited

U.S. PATENT DOCUMENTS

| | | | |
|---|---|---|---|
| 4,964,156 | 10/1990 | Blair | 379/40 |
| 5,177,780 | 1/1993 | Kasper et al. | 455/413 |
| 5,384,832 | 1/1995 | Zimmerman et al. | 379/67 |
| 5,418,835 | 5/1995 | Frohman et al. | 445/113 |
| 5,434,907 | 7/1995 | Hurst et al. | 379/88 |
| 5,664,009 | 9/1997 | Hurst et al. | 379/88 |

FOREIGN PATENT DOCUMENTS

WO 95/04424   2/1996   WIPO.

*Primary Examiner*—Willis R. Wolfe
*Assistant Examiner*—Hieu T. Vo
*Attorney, Agent, or Firm*—Heather S. Vance

[57] ABSTRACT

A system and method are provided for automatically notifying a user of an awaiting message. A wireless communication system including an identification system is utilized. The identification means identifies a registered user of the wireless communication system. A mail notification system is used for notifying the registered user of an awaiting message. A communication system checks for awaiting messages for the identified registered user. If an awaiting message is present, the communication system triggers the mail notification system.

17 Claims, 2 Drawing Sheets

SYSTEM AND METHOD FOR PROVIDING AUTOMATED MESSAGE NOTIFICATION IN A WIRELESS COMMUNICATION SYSTEM

BACKGROUND OF THE INVENTION

1. Field of the Invention

The invention relates to connecting a messaging system with a wireless communication system, and more particularly to a system and a method for automatically notifying a user of an awaiting message in a wireless communication environment.

2. Description of the Related Art

Messaging systems are common in both public and private areas. For example, voice mail messaging systems are located in almost every office environment and in many private homes. Public and private wireless systems which include cellular telephones are also common. When a cellular telephone user subscribes to a messaging system, such as voice mail, from their cellular carrier, the user must periodically check for messages in that user's message mailbox. This checking is done manually by placing telephone calls. Similarly, a user who is away from the office and/or home and awaiting some message(s) must periodically check for messages in the office and/or home message mailbox(es). This is usually done by calling the office voice mail system or the home voice mail system. An office voice mail system may be connected to a PBX (private branch exchange), and a home voice mail system may be connected to a central office. Thus, both of these systems can be accessed with a telephone call from a user. In these situations, the messaging systems rely on users to remember to check their message mailbox(es).

Outcalling is available in some voice mail systems. Systems with outcalling can be programmed to call a given number when a message is received, but this is not helpful in a wireless communication environment because the cellular telephone can be out of range or turned off.

Enhanced one-number services are available to allow a single cellular telephone to operate with multiple systems. In this arrangement, all telephone calls are transferred to (or follow) a single cellular telephone. While enhanced one-number services transfer calls to a single cellular telephone, they do not transfer awaiting messages.

In public wireless systems, it is desirable to reduce air time usage, and therefore reduce air time charges, and in private wireless systems, it is desirable to reduce congestion on an internal network and to improve usability. Finally, a system which provides simplified mobile message notification and reception is desirable.

SUMMARY OF THE INVENTION

According to the invention, a system and method for automatically notifying a user of an awaiting message are provided. A wireless communication system including an identification means is utilized. The identification means identifies a registered user of the wireless communication system. A mail notification system is used for notifying the registered user of an awaiting message. A communication means checks for awaiting messages for the identified registered user. If an awaiting message is present, the communication means triggers the mail notification system.

DETAILED DESCRIPTION

The present invention provides for automatically notifying a user of an awaiting message and for playing that message for the user in a wireless communication environment. This invention applies to any type of multimedia message (e.g., voice message, e-mail message, video message, facsimile message, etc.). In the detailed description below, the present invention is applied to voice messages (or voice mail).

Figure 1:
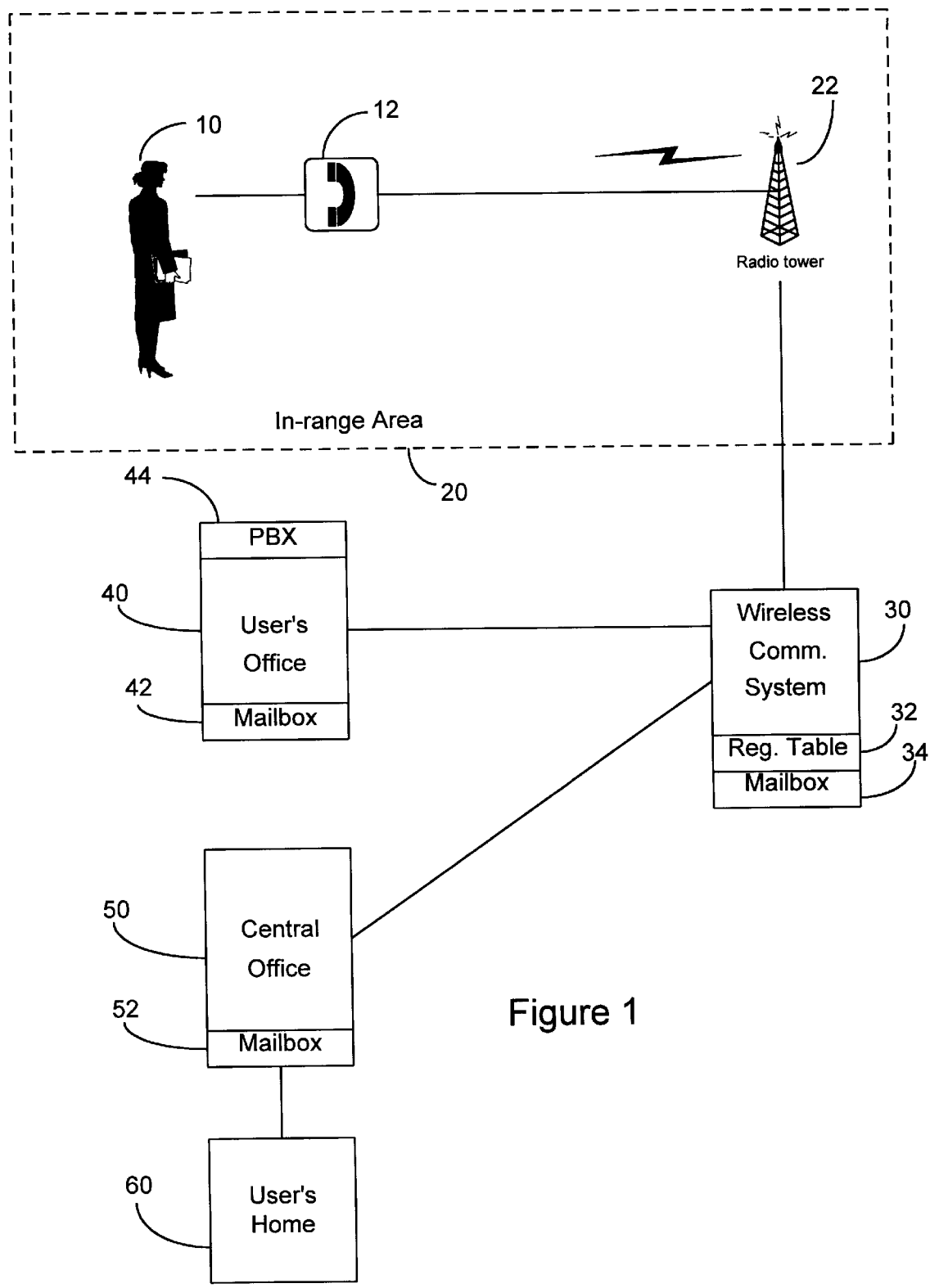
FIG. 1 illustrates an example of a communication environment for one embodiment of the present invention.

FIG. 1 illustrates an example of a communication environment for one embodiment of the present invention. In the preferred embodiment, the present invention checks for an awaiting message(s) whenever a user 10 with activated cellular telephone 12 moves into an "in-range" area 20 of a remote wireless base station 22. Wireless provider/carrier base station 22 includes a transmitter and a receiver for wireless communication. Wireless communication provider/carrier system 30 is then contacted by wireless base station 22. Wireless base station 22 provides wireless communication system 30 with the registration identification number assigned to cellular telephone 12. Either wireless base station 22 or wireless communication system 30 performs a check on the cellular telephone's registration identification number. These checks are normally done to confirm that cellular telephone 12 has a valid account (e.g., owned by a legitimate, registered user).

Wireless communication system 30 then uses the registration identification number to check its message mail registration table 32 and to determine if user 10 has an associated mailbox(es) 34. Hence, wireless communication system 30 uses the cellular telephone identification number to associate cellular telephone 12 with a particular message mailbox 34, or with multiple message mailboxes 34, 42, 52. In one embodiment of the present invention, multiple message mailboxes 34, 42, 52 are checked for awaiting messages. When an awaiting message is present in any of multiple message mailboxes 34, 42, 52, the user is automatically contacted. The messages from all of these multiple messaging systems can then be transferred to the user. For example, message mailbox 34 is attached to the cellular network and provided by wireless communication system 30. Additionally, user 10 may have land-based message mailbox 42 through a PBX message system 44 located at the user's office 40 and another land-based message mailbox 52 through a central office 50 which provides messaging services to user's home system 60.

After associated message mailboxes 34, 42, 52 are found, wireless communication system 30 sends a query to message mailboxes 34, 42, 52 to determine if any awaiting messages are present. If there are messages present, wireless communication system 30 notifies the user of the awaiting messages. This notification can be done, for example, by sending a message for display on cellular telephone 12 or by placing a telephone call to cellular telephone 12. If a telephone call is placed to cellular telephone 12, user 10 can be offered the option of connecting to the message mailbox(es) with awaiting messages immediately.

After a user is "in-range" of wireless base station 22, wireless communication system 30 can continue to provide this service by either regularly polling the messaging system(s), or by having the messaging system(s) notify it if any new messages for user 10 arrive. If regular polling is used, wireless communication system 30 contacts messaging systems 34, 42, 52 after a predetermined waiting period. This contacting, waiting and then contacting again continues until user 10 leaves area 20 or cellular telephone 12 is turned off.

In another embodiment of the present invention, the messaging system is used to contact the user. Once the messaging system is notified by the wireless communication provider that a user is "in-range," the messaging system could place a telephone call to the user for notification purposes. The messaging system could then play the message for the user, if desired.

Figure 2:
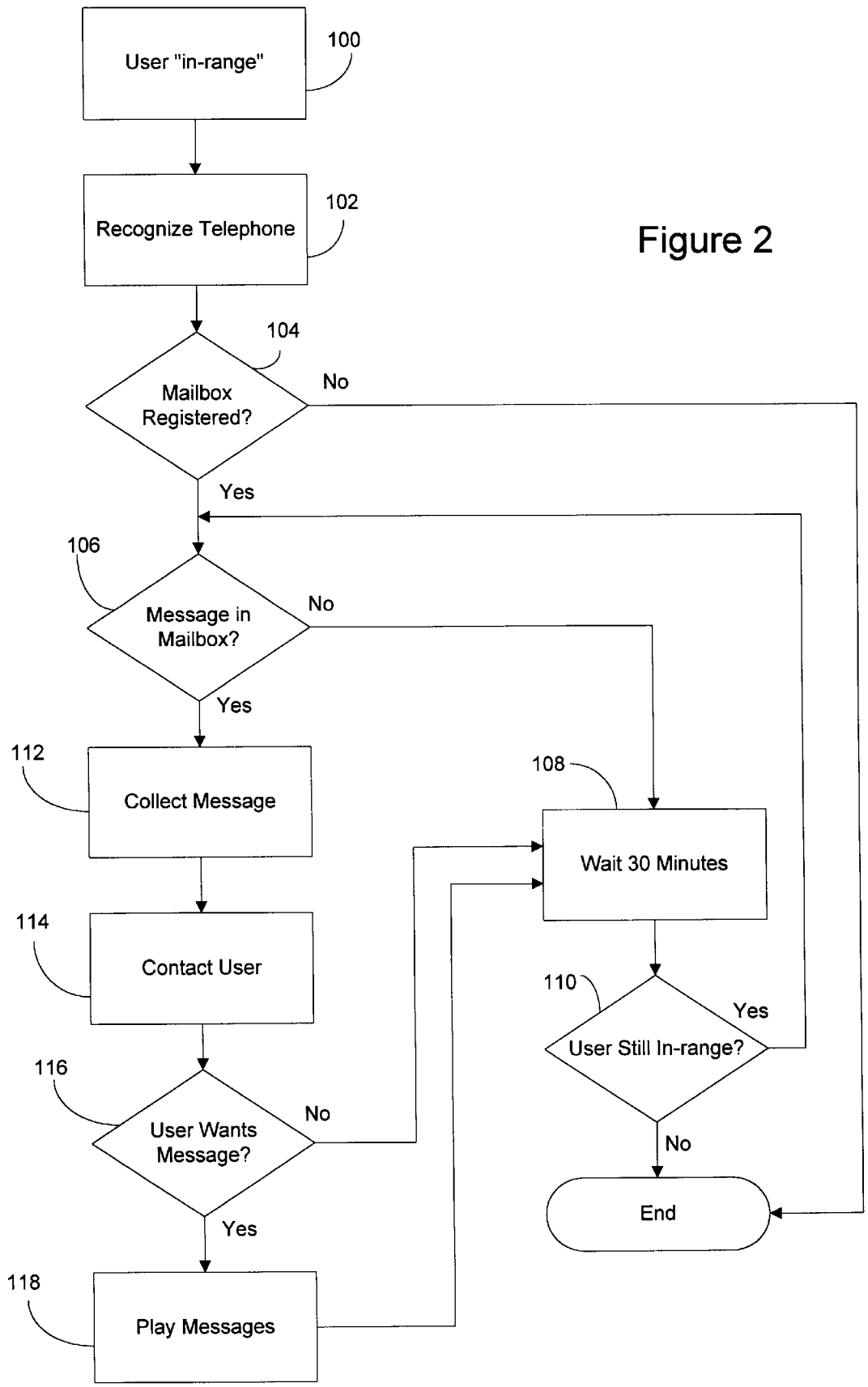
FIG. 2 is a process flow chart for an embodiment of the present invention.

FIG. 2 is a process flow chart for an embodiment of the present invention. At step 100, a user with an activated cellular telephone arrives in an area covered by a wireless base station. At step 102, the system recognizes the user's cellular telephone. Standard registration techniques are used for recognizing the cellular telephone. At step 104, the system checks for message mailbox registration. If no mailboxes are registered for that user, the process ends. If a mailbox (or mailboxes) is registered, the system moves on to step 106. At step 106, the system queries the registered message mailbox(es). If no messages are present, the system waits a predetermined amount of time (e.g., 30 minutes) at step 108. At step 110, the system checks if the user is still "in-range." If the user is out-of-range, the process ends. Also, If the cellular telephone is turned off, the process ends. If the user is in-range, the system returns to step 106. The system checks again for messages at step 106. If messages are waiting for the user, the system collects the message(s) at step 112. Step 112 is optional. For example, if the user's messaging system(s) is used to contact the user about awaiting messages, the system does not need to collect the message(s).

At step 114, the user is contacted regarding the awaiting message(s). This contacting can be done by either the wireless communication provider or each of the user's messaging systems. As stated above, this contacting can be done by providing information on the display of the user's cellular telephone or by calling the user's cellular telephone. If information is provided on the display of the cellular telephone, this information can include which of the user's messaging systems contains the awaiting message. Thus, the user could then directly call the appropriate messaging system. At step 116, the system determines if the user wants to play the awaiting message(s). This can be done by the user, for example, by entering a code into the user's cellular telephone or by answering prompts provided by the telephone call which notifies the user of the awaiting messages. If the user wants to play the awaiting message(s), the system plays the messages at step 118. This is done by either playing the collected messages or by connecting the user to the messaging system which contains the awaiting message. The system waits a predetermined amount of time at step 108. The system then checks if the user is still in-range at step 110. If the user is still in range, the system returns to step 106 and checks for messages. If the user does not want to play the awaiting message(s) the system moves directly to step 108 and waits.

The user can interact with the present system. For example, by calling a special telephone number or by entering a code into the cellular telephone, the user can disable the present system or change the parameters of the present system. To change the parameters, the user could, for example, change the predetermined amount of time the system waits before rechecking for messages. In the preferred embodiment, the process shown in FIG. 2 continues until the user is out-of-range or the cellular telephone is turned off. Also, the process shown in FIG. 2 repeats itself whenever a user comes in range of a wireless base station. Therefore, the system follows the user from station to station.

The present invention can be applied in an in-building wireless system. For example, some offices have wireless systems which allow their employees to move inside buildings or around campases (i.e., clusters of buildings in close proximity) while remaining connected to their PBX or central office with a wireless connector. With the present invention, users within a building or campus area would be treated as thought they were in-range of a wireless base station. Furthermore, these in-building wireless systems are often limited in channel capacity such that application of the present invention would dramatically reduce congestion.

The present invention provides numerous advantages. For example, by providing for automatic contact when an awaiting message is present, the user makes fewer telephone calls. This occurs because the user does not need to periodically check for awaiting messages. The periodic polling of multiple messaging systems can result in many unnecessary telephone calls. In public wireless systems, air time usage is reduced. Thus, air time charges are reduced. Similarly, in private wireless systems, congestion on the internal network is reduced and usability is improved. Additionally, enhanced security is provided by the present invention. This occurs because the cellular telephone's hardware registration identification number can be used as an added requirement for accessing a user's message(s). The user's password could be eliminated, but in the preferred embodiment, both the registration identification number and the user's password are required for access to awaiting message(s).

We claim:

1. A system for automatically notifying a user of an awaiting message, comprising:

identification means for identifying a registered user of a wireless communication system, the identification means being located in the wireless communication system;

mail notification means for notifying the registered user of an awaiting message; and communication means for checking for awaiting messages in multiple mailboxes associated with the registered user, and for triggering the mail notification means if an awaiting message is present, wherein the multiple mailboxes being located in multiple messaging systems.

2. The system for automatically notifying a user of an awaiting message of claim 1, wherein the communication means checks each of the multiple mailboxes on a periodic basis.

3. The system for automatically notifying a user of an awaiting message of claim 1, wherein the mail notification means is a voice mail notification system.

4. The system for automatically notifying a user of an awaiting message of claim 1, wherein the mail notification means connects the registered user with a mailbox in a messaging system containing the awaiting message.

5. The system for automatically notifying a user of an awaiting message of claim 1, wherein the mail notification means collects the awaiting message and gives the registered user the option of listening to the awaiting message.

6. The system for automatically notifying a user of an awaiting message of claim 5, wherein the identification means identifies a registration number, and wherein both the registration number and a password are needed for listening to the awaiting message.

7. The system for automatically notifying a user of an awaiting message of claim 1, wherein the registered user can interact with the system and disable the system.

8. The system for automatically notifying a user of an awaiting message of claim 1, wherein a telephone call is placed to the registered user, the telephone call notifying the registered user of the awaiting message.

9. A method for automatically notifying a user of an awaiting message, comprising the steps of:

a) recognizing a cellular telephone, the recognizing using a registration number of the cellular telephone, the registration number identifying a user;

b) checking for mailboxes associated with the user;

c) checking for awaiting messages in the mailboxes if the mailboxes exist, wherein the mailboxes are located in multiple messaging systems; and d) contacting the user with information related to the awaiting message if the awaiting message is present.

10. The method for automatically notifying a user of an awaiting message of claim 9, further comprising the step of collecting the awaiting message if the awaiting message is present.

11. The method for automatically notifying a user of an awaiting message of claim 10, further comprising the step of playing the collected messages for the user.

12. The method for automatically notifying a user of an awaiting message of claim 9, further comprising the step of repeating steps c) and d) periodically until the user is out-of-range.

13. The method for automatically notifying a user of an awaiting message of claim 9, wherein a mailbox registration table is used when checking for the mailboxes.

14. The method for automatically notifying a user of an awaiting message of claim 9, further comprising the step of connecting the user to the mailbox with the awaiting message.

15. The method for automatically notifying a user of an awaiting message of claim 9, wherein the user is contacted by placing a telephone call to the cellular telephone.

16. The method for automatically notifying a user of an awaiting message of claim 9, wherein the messages are voice mail messages.

17. The system for automatically notifying a user of an awaiting message of claim 1, wherein the multiple messaging systems include at least one of a PBX, a central office and the wireless communication system.

\* \* \* \* \*

(12) EX PARTE REEXAMINATION CERTIFICATE (7731st)
United States Patent
Beyda et al.

(10) Number: US 5,889,839 C1
(45) Certificate Issued: Sep. 14, 2010

(54) SYSTEM AND METHOD FOR PROVIDING AUTOMATED MESSAGE NOTIFICATION IN A WIRELESS COMMUNICATION SYSTEM

(75) Inventors: William J. Beyda, Cupertino, CA (US); Shmuel Shaffer, Palo Alto, CA (US)

(73) Assignee: Research in Motion Limited, Waterloo, Ontario (CA)

Reexamination Request:
No. 90/010,168, May 16, 2008

Reexamination Certificate for:
Patent No.: 5,889,839
Issued: Mar. 30, 1999
Appl. No.: 08/724,295
Filed: Sep. 19, 1996

(51) Int. Cl.
*H04M 3/533* (2006.01)
*H04M 3/50* (2006.01)
*H04M 3/537* (2006.01)
*H04Q 7/38* (2006.01)

(52) U.S. Cl. ............... 379/88.12; 379/88.22; 379/88.25; 455/412.2; 455/413

(58) Field of Classification Search ................. 379/88.12
See application file for complete search history.

(56) References Cited

U.S. PATENT DOCUMENTS

| | | | |
|---|---|---|---|
| 4,837,798 A | 6/1989 | Cohen et al. | |
| 4,964,156 A | 10/1990 | Blair | |
| 5,177,780 A | 1/1993 | Kasper et al. | |
| 5,313,515 A | 5/1994 | Allen et al. | |
| 5,333,266 A | 7/1994 | Boaz et al. | |
| 5,384,832 A | 1/1995 | Zimmerman et al. | |
| 5,418,835 A | 5/1995 | Frohman et al. | |
| 5,434,907 A | 7/1995 | Hurst et al. | |
| 5,664,009 A | 9/1997 | Hurst et al. | |
| 5,742,668 A | 4/1998 | Pepe et al. | |
| 5,742,905 A | 4/1998 | Pepe et al. | |
| 5,758,279 A | 5/1998 | Foti | |
| 5,764,747 A | 6/1998 | Yue et al. | |
| 5,802,466 A | 9/1998 | Gallant et al. | |
| 5,809,415 A | 9/1998 | Rossmann | |
| 6,069,890 A | 5/2000 | White et al. | |
| 6,148,193 A | 11/2000 | Miska et al. | |

FOREIGN PATENT DOCUMENTS

| | | |
|---|---|---|
| JP | 5236107 A | 9/1993 |
| WO | WO 94/06236 A2 | 3/1994 |
| WO | WO 94/27394 A1 | 11/1994 |
| WO | WO 95/04424 A1 | 2/1995 |
| WO | WO 96/11542 A2 | 4/1996 |
| WO | WO 97/33421 A1 | 9/1997 |

OTHER PUBLICATIONS

Seybold, Andrew M., *Using Wireless Communications in Business*, Van Nostrand Reinhold, An International Thomson Publishing Company, 1994, pp. 16–124.
GSM Report 03–42, "Advanced MHS Access", Jan. 20, 1989, pp.1–14.
GSM 03.40/1 Recommendation, "Technical Realization of the Point–to–Point Short Message Service", Nov. 18, 1988.
Halfhill, Tom R. et al., "Just like Magic?", Byte.com, Feb. 1994, pp. 1–4.
O'Malley, Chris, "BellSouth's Communicative Simon is a Milestone in the Evolution of the PDA", Byte.com, Dec. 1994, pp. 1–7.

(Continued)

*Primary Examiner*—Fred Ferris

(57) ABSTRACT

A system and method are provided for automatically notifying a user of an awaiting message. A wireless communication system including an identification system is utilized. The identification means identifies a registered user of the wireless communication system. A mail notification system is used for notifying the registered user of an awaiting message. A communication system checks for awaiting messages for the identified registered user. If an awaiting message is present, the communication system triggers the mail notification system.

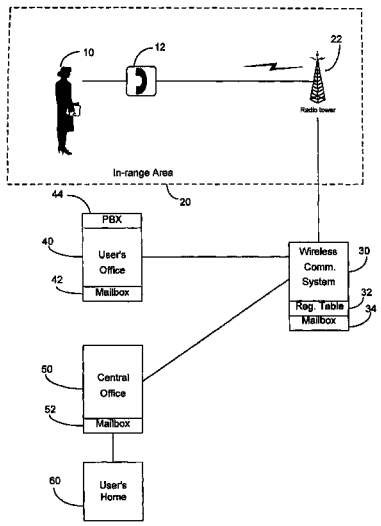

OTHER PUBLICATIONS

Wikipedia, "GSM: Global System for Mobile Communications", wikipedia.org, printed Nov. 29, 2007, pp. 1–6.

Fisher, Lawrence M., "A Rush to Stake Claims on the Multimedia Frontier", The New York Times, May 30, 1993, pp. 1–4.

Octel Communications Corp., "10–K405 SEC Filing", Jun. 30, 1996, pp. 1–100.

Phrak 50 Magazine, "Skytel Paging and Voicemail, The PBXPhreak", Sep. 4, 1997, vol. 7, Issue 50, 10 of 16, pp. 1–21.

Business Wire, "Wall Street Goes Wireless: RadioMail Introduces Personal Interactive Mobile Stock Quote Service", Feb. 9, 1995, pp. 1–2.

Skytel, "SkyTel and Compuserve Team to Provide Wireless Messaging Services in Countries Worldwide", May 1, 1995, pp. 1–2.

Skytel, "Mtel and MCI Enter Agreement to Deliver Wireless Messaging to Business Customers", Jan. 6, 1995, pp. 1–2.

Skytel, "Nec and SkyTel Introduce Wireless Messaging for Versa Notebooks", Nov. 7, 1994, pp. 1–2.

Wikipedia, "biff" wikipedia.org, printed Oct. 26, 2007, pp. 1–2.

ITU International Telecommunication Union, "Message Handling System and Service Overview", Fascicle VIII.7–Rec. X.400 (date unknown), pp. 3–71.

ITU International Telecommunication Union, "Message Handling Systems: Overall Architecture", Fascicle VIII.7–Rec. X–402, 1988, pp. 79–146.

ITU International Telecommunication Union, "Message Handling Systems: Message Transfer System: Abstract Service Definition and Procedures", Fascicle VIII.7, rec. X.411, 1984, amended 1988. pp. 272–425.

ITU International Telecommunication Union, "Message Handling Systems: Message Store: Abstract–Service Definition", Fascicle VIII.7–Rec. X.413, 1988, pp. 426–440.

ITU International Telecommunication Union, "Message Handling Systems: Protocol Specifications", Fascicle VIII.7–Rec. X.419, 1988, pp. 502–542.

ITU International Telecommunication Union, "Message Handling Systems: Interpersonal Messaging System", Fascicle VIII.7–Rec. X.420, 1984, amended 1988, pp. 543–628.

HP–UX, "XBUFFY (1)", Apr. 20, 1994, pp. 1–6.

"XMULTIBIFF(1)", Feb. 21, 1994, pp. 1–6.

Leshin, Mitchell W., "Private Conversation Voice Message for Trunked 2–Way Radio Systems" Motorola Technical Developments, vol. 12, No. 6, Apr. 1, 1991, pp. 147–148.

European Search Report for European Patent Application No. 97307300.0, dated Jun. 4, 1999.

European Examination Report for European Patent Application No. 97307300.0, dated Mar. 15, 2004.

GSM 02.17 version 4.3.3, Sep. 1994, "European digital cellular telecommunications system (Phase 2); Subscriber Identity Modules (SIM) Functional characteristics".

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-17 is confirmed.

New claims 18-23 are added and determined to be patentable.

*18. The system for automatically notifying a user of awaiting message of claim 1, wherein the mail notification means is an e-mail notification system.*

*19. The system for automatically notifying a user of awaiting message of claim 1, wherein the mail notification means is a video message notification system.*

*20. The system for automatically notifying a user of awaiting message of claim 1, wherein the mail notification means is a facsimile message notification system.*

*21. The method for automatically notifying a user of awaiting message of claim 9, wherein the messages are e-mail messages.*

*22. The method for automatically notifying a user of awaiting message of claim 9, wherein the messages are video messages.*

*23. The method for automatically notifying a user of awaiting message of claim 9, wherein the messages are facsimile messages.*

\* \* \* \* \*